(12) United States Patent
Tazoe

(10) Patent No.: US 8,959,969 B2
(45) Date of Patent: Feb. 24, 2015

(54) METHOD AND DEVICE FOR MANUFACTURING SEPARATOR FOR POLYMER ELECTROLYTE FUEL CELL

(75) Inventor: Nobuhiro Tazoe, Tokyo (JP)

(73) Assignee: IHI Corporation, Tokyo (JP)

( * ) Notice: Subject to any disclaimer, the term of this patent is extended or adjusted under 35 U.S.C. 154(b) by 442 days.

(21) Appl. No.: 13/501,760

(22) PCT Filed: Dec. 21, 2009

(86) PCT No.: PCT/JP2009/007050
§ 371 (c)(1),
(2), (4) Date: Apr. 13, 2012

(87) PCT Pub. No.: WO2011/077474
PCT Pub. Date: Jun. 30, 2011

(65) Prior Publication Data
US 2012/0204616 A1 Aug. 16, 2012

(51) Int. Cl.
*B21B 29/00* (2006.01)
*B21D 13/04* (2006.01)
*H01M 8/02* (2006.01)
*B21D 22/08* (2006.01)
*H01M 8/10* (2006.01)

(52) U.S. Cl.
CPC ............... *H01M 8/026* (2013.01); *B21D 13/04* (2013.01); *B21D 22/08* (2013.01); *H01M 2008/1095* (2013.01); *H01M 2250/20* (2013.01); *H01M 8/0206* (2013.01); *Y02E 60/50* (2013.01); *Y02T 90/32* (2013.01)
USPC .............................. 72/197; 72/241.6; 72/245

(58) Field of Classification Search
USPC ............. 72/197, 240, 241.6, 241.8, 245, 248, 72/252.5, 187–189
See application file for complete search history.

(56) References Cited

U.S. PATENT DOCUMENTS

| | | | |
|---|---|---|---|
| 3,877,270 A | 4/1975 | Marten | |
| 4,699,050 A * | 10/1987 | Heise | ............................ 100/168 |
| 6,401,506 B1 * | 6/2002 | Ogawa et al. | ................... 72/14.4 |
| 7,310,982 B2 * | 12/2007 | Ogawa et al. | ................... 72/10.4 |
| 2006/0022301 A1 | 2/2006 | Sofue et al. | |
| 2011/0111329 A1 | 5/2011 | Tazoe | |

FOREIGN PATENT DOCUMENTS

| | | |
|---|---|---|
| EP | 2 312 678 A1 | 4/2011 |
| GB | 747347 | 4/1956 |
| JP | 60 160901 | 10/1985 |
| JP | 4 13421 | 1/1992 |
| JP | 2002-190305 A | 7/2002 |
| JP | 2004-90078 A | 3/2004 |
| JP | 2004-139861 A | 5/2004 |
| JP | 2004-220908 A | 8/2004 |

(Continued)

OTHER PUBLICATIONS

Extended Search Report issued Jun. 20, 2013 in Patent Application No. 09852492.9.

*Primary Examiner* — Debra Sullivan
(74) *Attorney, Agent, or Firm* — Oblon, Spivak, McClelland, Maier & Neustadt, L.L.P.

(57) ABSTRACT

Elimination of play between rolls 13 and main bearings 12 in a non-forming area and forming of material to be formed in a forming area are repeated while play between a housing 10 for the rolls 13 and main bearing axle boxes 11 is always eliminated.

2 Claims, 7 Drawing Sheets

(56) References Cited

FOREIGN PATENT DOCUMENTS

| JP | 2005 193243 | 7/2005 |
| JP | 2006 75900 | 3/2006 |
| JP | 2006-75900 A | 3/2006 |
| JP | 2008 307587 | 12/2008 |
| JP | 2010 33736 | 2/2010 |
| JP | 2010 33737 | 2/2010 |

\* cited by examiner

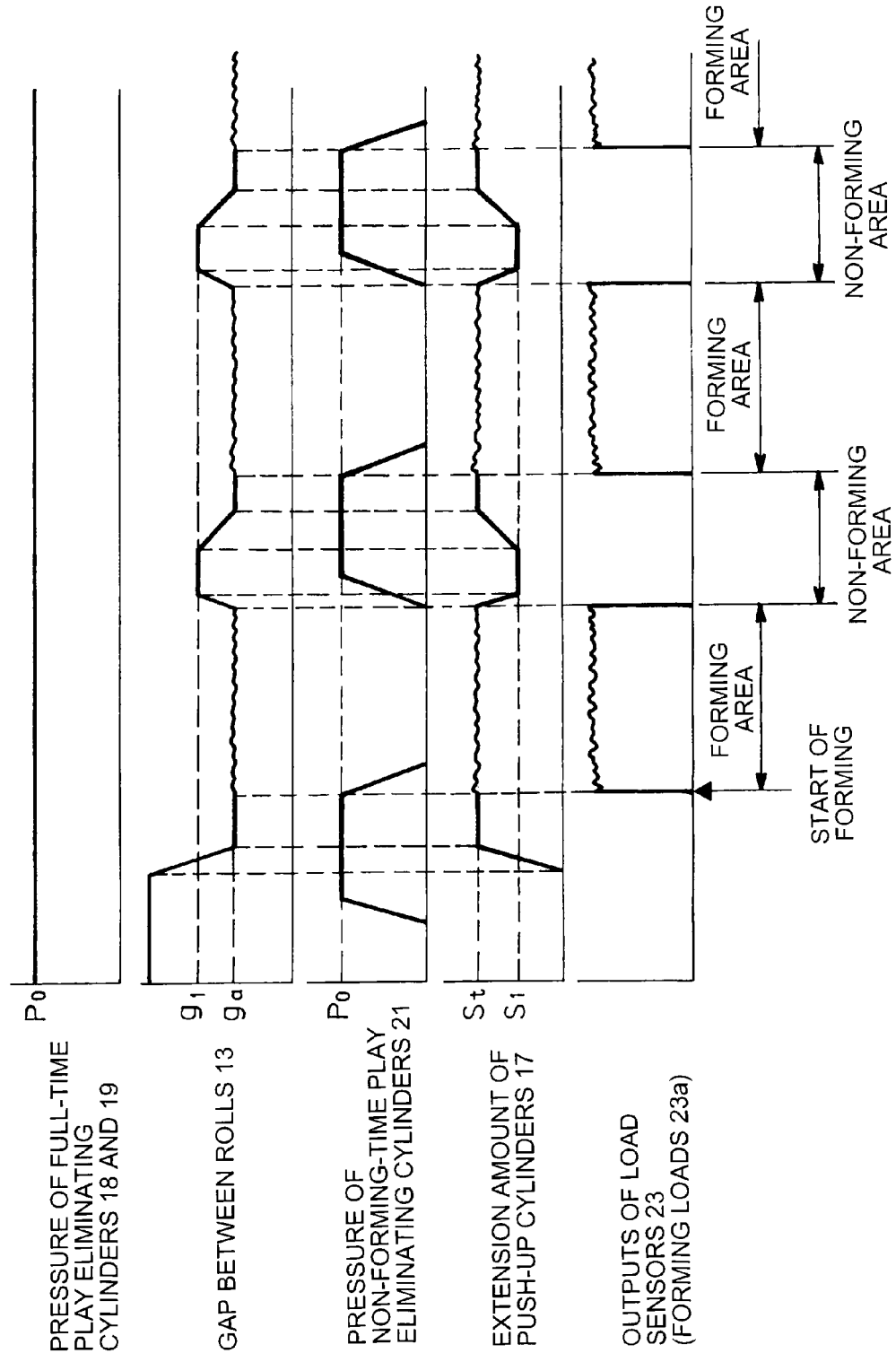

METHOD AND DEVICE FOR MANUFACTURING SEPARATOR FOR POLYMER ELECTROLYTE FUEL CELL

TECHNICAL FIELD

The present invention relates to a method and a device for manufacturing a separator for a polymer electrolyte fuel cell.

BACKGROUND ART

Generally, a polymer electrolyte fuel cell generally uses, as fuel, pure hydrogen or a hydrogen gas acquired by reforming alcohols, and generates electricity by electrochemically controlling a reaction of the hydrogen with oxygen in the air.

The polymer electrolyte fuel cell, which uses a solid, organic, hydrogen ion permselective membrane as an electrolyte, can be compactified as compared to conventional alkaline, phosphoric acid, molten carbonate, solid oxide or other fuel cells using an aqueous, fused salt electrolyte or other fluid medium as an electrolyte, and is under development for electric vehicles and other applications.

The polymer electrolyte fuel cell used has, as shown in FIG. 1, cells 5 each of which is of a sandwich structure provided by overlapping a separator 1 with formed or shaped convexes and concaves 1a and 1b, a hydrogen electrode 2, a polyelectrolyte membrane 3, an air (oxygen) electrode 4 and a separator 1 with formed or shaped convexes and concaves 1a and 1b. A number of cells 5 are stacked into a stack 6 to provide a hydrogen passage 7 defined by the separator 1 and the hydrogen electrode 2 in contact therewith, an air (oxygen) passage 8 defined by the separator 1 and the air electrode 4 in contact therewith and a cooling water passage 9 defined by the overlapped separators 1.

It is conventionally assumed that the separator 1 has a flat margin and a central bulge with a number of convexes and concaves 1a and 1b formed by press forming. However, actually attempted processing of a material made of sheet metal to be formed reveals that the press forming into the shape described above has difficulty since ductile fracture may occur in the bulge with the formed convexes and concaves 1a and 1b. Moreover, attempt of mass manufacturing the separators 1 by press forming will problematically reduce the production efficiency.

In order to overcome the problems, it is recently proposed to oppositely arrange a pair of rolls having surfaces with forming areas with created convexes and concaves and to introduce and pressurize a material made of sheet metal to be formed between the rolls, thereby continuously manufacturing a separator 1 with passages (hydrogen, air and cooling water passages 7, 8 and 9) formed correspondingly to the concaves and convexes on the rolls.

A state-of-the-art technology of a device for manufacturing a separator 1 for a polymer electrolyte fuel cell as shown in FIG. 1 is disclosed, for example, in Patent Literature 1.

CITATION LIST

Patent Literature

Patent Literature 1: JP 2002-190305A

SUMMARY OF INVENTION

Technical Problems

However, it has been still demanded to form or shape a material made of stainless steel or other sheet metal to be formed with high accuracy and more and more thinly (to a thickness of 0.1 mm or so) for the separator 1. Mere utilization of a rolling device would fail in acquiring a requested accuracy due to play between a housing for rolls and main bearing axle boxes and that between the rolls and main bearings.

The invention was made in view of the above and has its object to provide a method and a device for manufacturing a separator for a polymer electrolyte fuel cell capable of forming a material made of sheet metal to be formed with high accuracy and without deteriorated production efficiency, and efficiently manufacturing the separator with high accuracy.

Solution to Problems

The invention is directed to a method for producing a separator for a polymer electrolyte fuel cell wherein a material made of sheet metal to be formed is introduced and pressurized between a pair of rolls circumferentially alternately having a forming area with concaves and convexes created on a surface and a non-forming area with no concaves and convexes, thereby continuously manufacturing the separator with passages formed corresponding to the concaves and convexes of the rolls, characterized in that before start of forming, with play in vertical and horizontal directions between a housing and main bearing axle boxes for said rolls being eliminated by an operation of full-time play eliminating cylinders, a gap between the rolls is retained greater than a setting value and play between the rolls and main bearings is eliminated by an operation of non-forming-time play eliminating cylinders;

in this state, push-up cylinders are extended to make the gap between the rolls into the setting value; and upon generation of forming load due to the introduced material between the rolls which is determined as entering into a forming area, the material is formed with pressures of the non-forming-time play eliminating cylinders being set to 0;

upon the forming loads turning to 0 which is determined as entering into a non-forming area, said push-up cylinders are retracted to make the gap between the rolls greater than the setting value, and the play between the rolls and the main bearings is eliminated by the operation of the non-forming-time play eliminating cylinders;

the gap between the rolls is then made into the setting value again by extension of the push-up cylinders; and upon generation of the forming load which is determined as entering into the forming area, the material is formed with the pressures of said non-forming-time play eliminating cylinders being set to 0;

subsequently, the elimination of the play between the rolls and the main bearings in the non-forming area and the forming of the material in the forming area are repeated while the play between the housing and the main bearing axle boxes is always eliminated.

The invention is directed also to a device for producing a separator for a polymer electrolyte fuel cell wherein a material made of sheet metal to be formed is introduced and pressurized between a pair of rolls circumferentially alternately having a forming area with concaves and convexes created on a surface and a non-forming area with no concaves and convexes, thereby continuously manufacturing the separator with passages formed corresponding to the concaves and convexes of the rolls, characterized in that it comprises push-up cylinders capable of adjusting a gap between said rolls, full-time play eliminating cylinders arranged between a housing for said rolls and main bearing axle boxes for eliminating play in vertical and horizontal directions, auxiliary bearings fitted to necks of said rolls, non-forming time play eliminating cylinders arranged between said auxiliary bearings for eliminating play between said rolls and the main bearings, load sensors for sensing forming loads and a controller for outputting operational signals to said push-up, full-time play eliminating and non-forming-time play eliminating cylinders, respectively, on the basis of the forming loads sensed by said load sensors, whereby elimination of the play between the rolls and the main bearings in the non-forming area and forming of the material in the forming area are repeated while the play between the housing and the main bearing axle boxes is always eliminated.

According to the above-mentioned means, the following effects are acquired.

The play between the housing and the main bearing axle boxes for the rolls is eliminated by the operation of the full-time play eliminating cylinders and the play between the rolls; the main bearings is eliminated by the operation of the non-forming-time play eliminating cylinders; and the gap between the rolls can be retained at the setting value with high accuracy. As a result, even if the material is made of extremely thin sheet metal, the accuracy required for the forming is acquired to enable the efficient manufacturing of the separator with high accuracy.

In the device for manufacturing the separator for the polymer electrolyte fuel cell, it is effective for transmitting a rotative force to the rolls with a play of a rotative power transmission system minimized in the rotational direction that roll shafts of the rolls are directly coupled to separate servo motors through reduction gears including their respective strain wave gearing mechanisms and said reduction gears are directly coupled to the corresponding main bearing axle boxes.

Advantageous Effects of Invention

A method and a device for manufacturing a separator for a polymer electrolyte fuel cell of the invention can achieve excellent effects that a material made of sheet metal to be formed can be formed with high accuracy without deteriorated production efficiency and a separator can be efficiently produced with high accuracy.

BRIEF DESCRIPTION OF DRAWINGS

FIG. 7 is a control chart of a relationship among outputs of the load sensors, operational states of full-time, non-forming-time play eliminating and push-up cylinders and a gap between the rolls before start of the forming and in forming and non-forming areas in the embodiment of the invention.

DESCRIPTION OF EMBODIMENT

An embodiment of the invention will be described with reference to the accompanying drawings.

Figure 2:
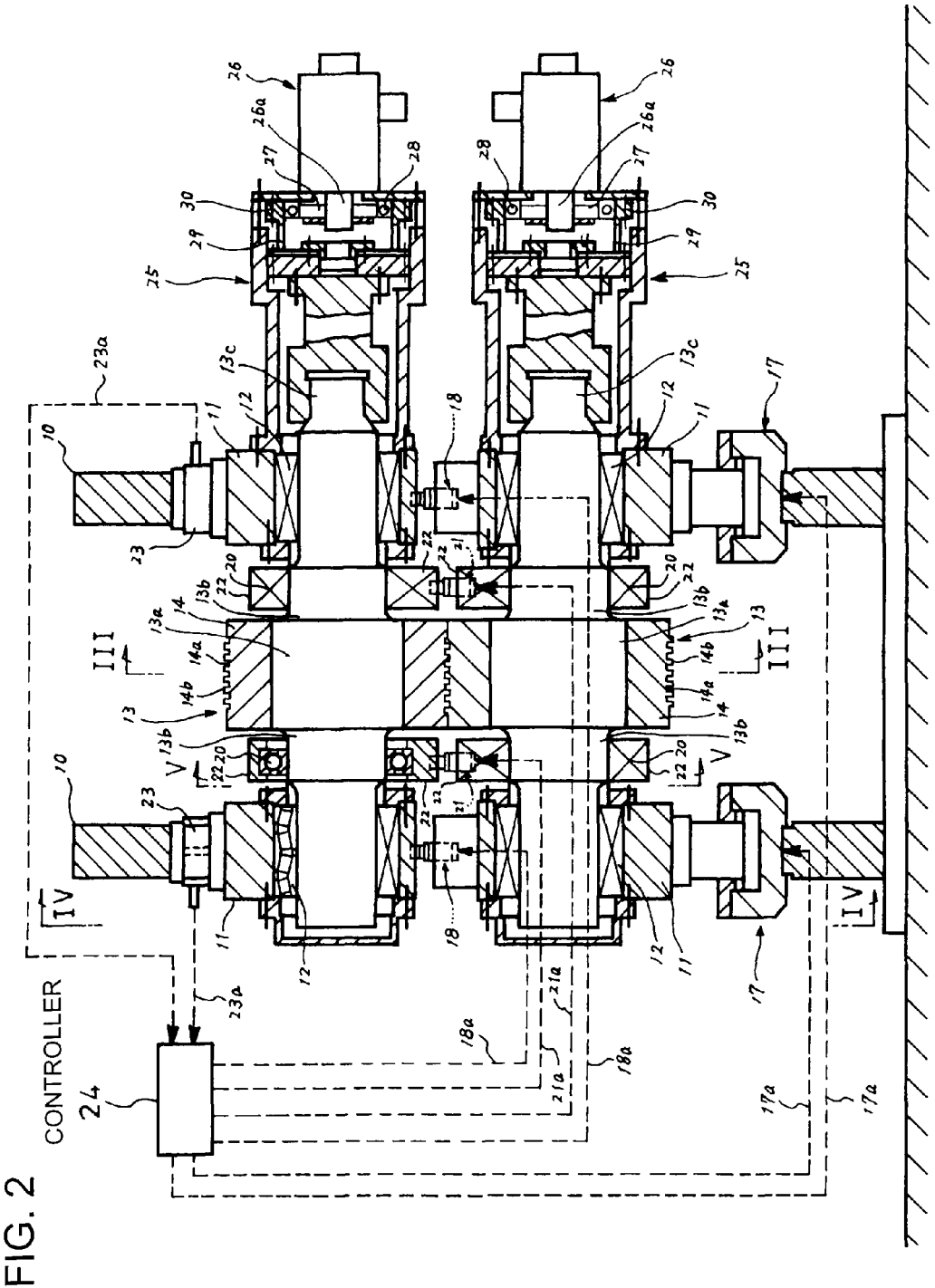
FIG. 2 is an overall sectional side elevation showing an embodiment of the invention.
Figure 3:
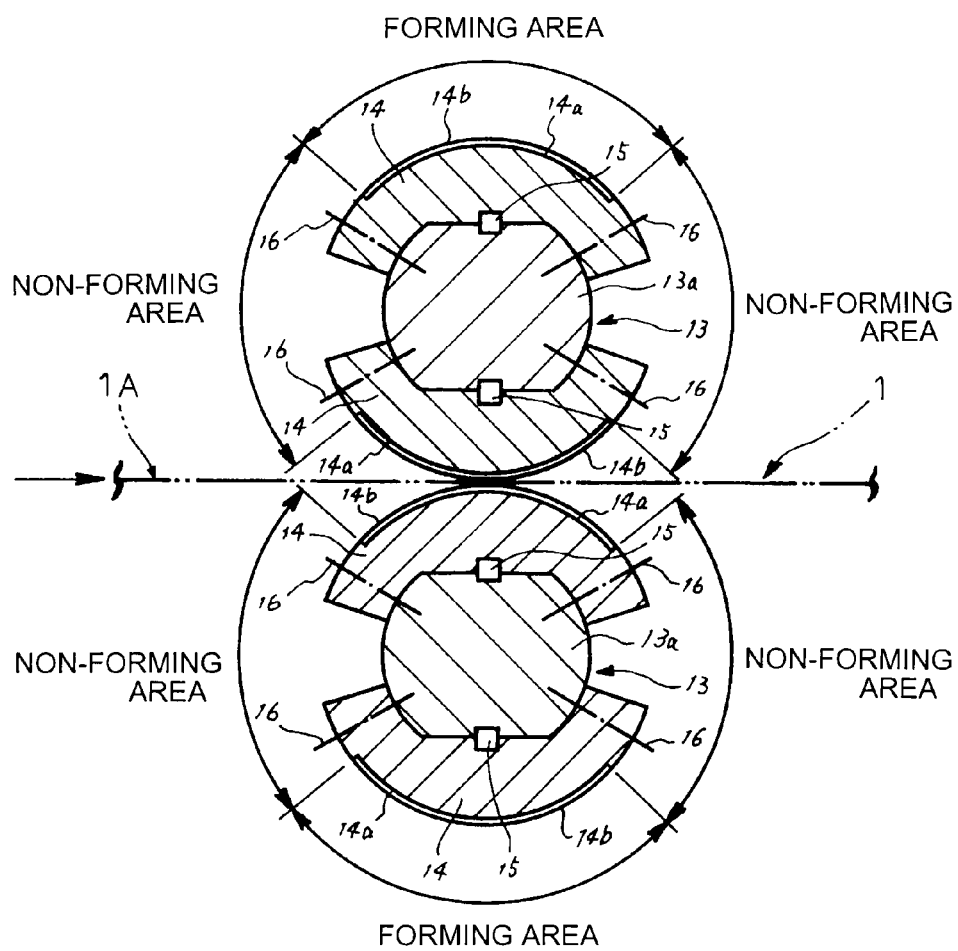
FIG. 3 is a sectional view of rolls in the embodiment of the invention, corresponding to a sectional view taken along III-III in FIG. 2.
Figure 4:
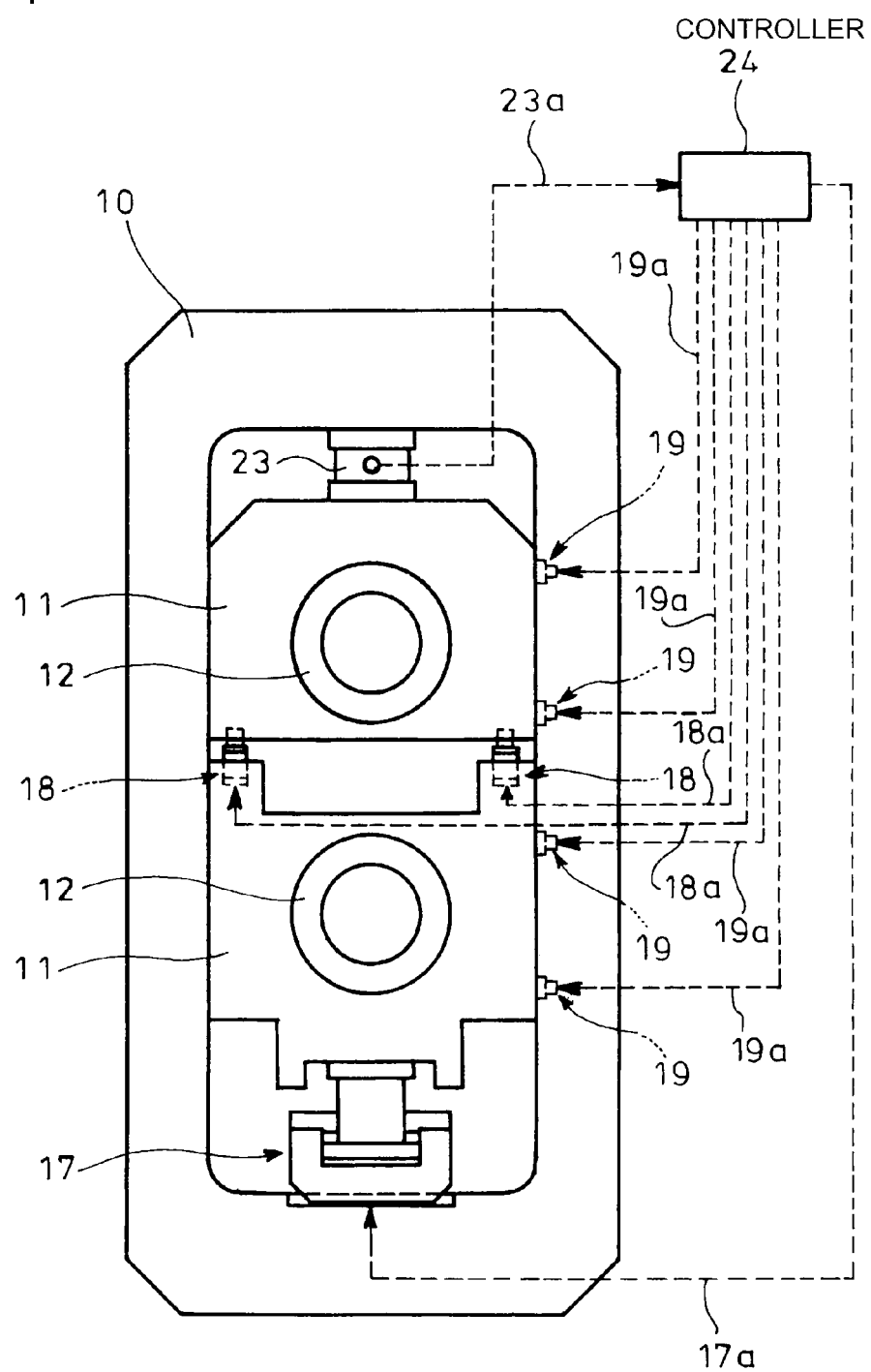
FIG. 4 is a diagram of full-time play eliminating cylinders which eliminate play between the rolls and main bearings in the embodiment of the invention, corresponding to an arrow view taken along IV-IV in FIG. 2.

FIGS. 2 to 7 show the embodiment of the invention. Reference numeral 10 denotes a housing; 11, main bearing axle boxes arranged in the housing 10; 12, main bearings arranged in the main bearing axle boxes 11; and 13, a pair of rolls arranged vertically oppositely to each other and rotatably supported by the main bearings 12 to the housing 10. As shown in FIGS. 2 and 3, the roll 13 circumferentially alternately has a forming area with concaves 14a and convexes 14b created on a surface and a non-forming area with no concaves 14a and convexes 14b.

In the embodiment, the forming and non-forming areas are circumferentially alternately formed on the roll 13 by fitting two arc-shaped dies 14 each having the forming area with the concaves 14a and the convexes 14b created on the surface onto a roll body 13a of the roll 13 with keys 15 and bolts or other fastening members 16.

Arranged in a lower portion of the housing 10 are push-up cylinders 17 capable of adjusting a gap between the rolls 13 by pushing up and down the main bearing axle boxes 11 of the roll 13 on the lower side. Arranged between the housing 10 and the main bearing axle boxes 11 of the rolls 13 are full-time play eliminating cylinders 18 and 19 (see FIGS. 2 and 4) eliminating play in vertical and horizontal directions. Fitted to necks 13b of the rolls 13 are auxiliary bearings 20. Arranged between the auxiliary bearings 20 are non-forming time play eliminating cylinders 21 (see FIGS. 2 and 5) eliminating play between the rolls 13 and the main bearings 12. Arranged in an upper portion of the housing 10 are load cells or other load sensors 23 sensing forming loads 23a. A controller 24 is arranged to output operational signals 17a, 18a, 19a and 21a to the push-up cylinders 17, the full-time play eliminating cylinders 18 and 19 and the non-forming-time play eliminating cylinders 21, respectively, on the basis of the forming loads 23a sensed by the load sensors 23.

The non-forming-time play eliminating cylinder 21 is interposed between half-divided auxiliary bearing covers 22 attached to cover the outer circumferences of the auxiliary bearings 20.

Roll shafts 13c of the respective rolls 13 are directly coupled to separate servo motors 26 through reduction gears 25 with their respective strain wave gearing mechanisms, which are so-called harmonic drives (registered trademark), and the reduction gears 25 are directly coupled to the corresponding main bearing axle boxes 11.

Figure 6A:
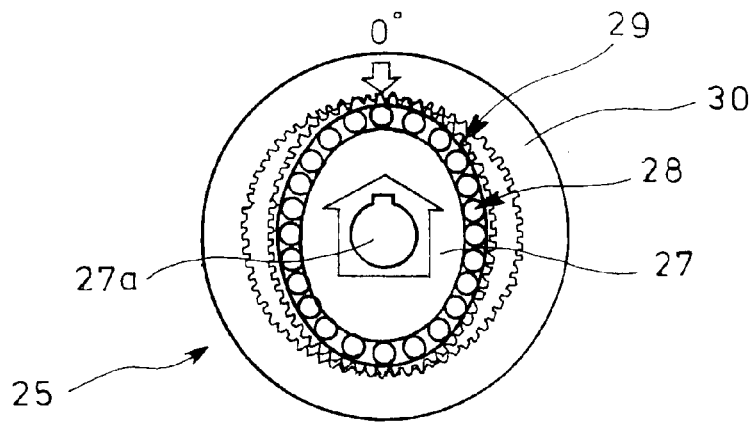
FIG. 6a is an elevation for explaining a principle of a strain wave gearing mechanism of a reduction gear applied to the device for manufacturing a separator for a polymer electrolyte fuel cell of FIG. 2, showing a state before starting rotation of a wave generator.
Figure 6B:
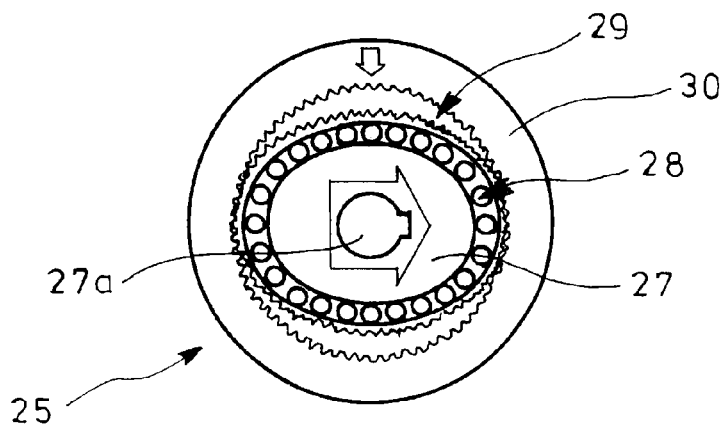
FIG. 6b is an elevation for explaining the principle of the strain wave gearing mechanism of the reduction gear applied to the device of FIG. 2, showing a state when the wave generator is rotated clockwise by 90 degrees.
Figure 6C:
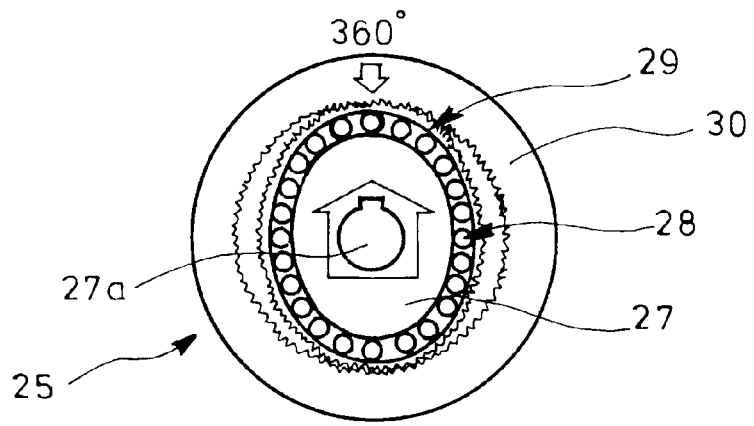
FIG. 6c is an elevation for explaining the principle of the strain wave gearing mechanism of the reduction gear applied to the device of FIG. 2, showing a state when the wave generator is rotated clockwise by 360 degrees.

As shown in FIGS. 6a to 6c, the reduction gear 25 with the strain wave gearing mechanism comprises a wave generator 27 having an elliptical outer circumference, an elastically deformable flexspline 29 having an outer circumference with a number of external teeth and fitted over the wave generator 27 via a bearing 28, circumferentially deflected positions of the flexspline 29 sequentially changing due to rotation of the wave generator 27 as shown in FIGS. 6b and 6c, and a non-rotative circular spline 30 located circumferentially of the flexspline 29 and having internal teeth fitted with the external teeth of the flexspline 29, positions of the internal teeth of the circular spline fitted with the external teeth of the flexspline being changed as the deflected positions of the flexspline 29 change. The wave generator 27 has a shaft hole 27a into which a shaft 26a of the servo motor 26 is fitted (see FIG. 2); and the flexspline 29 is connected with the roll shaft 13c of the roll 13. The number of the external teeth of the flexspline 29 is several fewer than that of the internal teeth of the circular spline 30.

For example, when the wave generator 27 rotates clockwise in FIG. 6a due to the drive of the servo motor 26, the flexspline 29 elastically deforms; the external teeth of the flexspline 29 engage with the internal teeth of the circular spline 30 at long axis portions of the ellipse of the wave generator 27, the external teeth of the flexspline 29 completely departing from the internal teeth of the circularspline 30 at short axis portions of the ellipse of the wave generator 27; as a result, the engaging positions between the external teeth of the flexspline 29 and the internal teeth of the circular spline 30 sequentially move circumferentially (clockwise) (see FIG. 6b); and when the wave generator 27 rotates one revolution, the engaging positions between the external teeth of the flexspline 29 and the internal teeth of the circularspline 30 are moved from the positions at the start of rotation (see FIG. 6c). As a result, the flexspline 29 is located short of the positions at the start of rotation by the number of the external teeth less than the number of the internal teeth of the circularspline 30 (see FIG. 6c) and, therefore, the flexspline 29 is moved in the direction opposite to the rotational direction of the wave generator 27 (in the counterclockwise direction in FIG. 6c), which is picked up as a rotational output by the roll shaft 13c of the roll 13.

Backlash of the reduction gear 25 itself, which directly affects rotational variations of the roll 13, must be minimal. Since the reduction gear 25 with the strain wave gearing mechanism is a reduction gear having extremely minimal backlash as described above, play of the rotative power system (variation in rotative phase difference) are reduced by the reduction gear 25 to a negligible level in the invention.

Further in the embodiment, as shown in FIG. 7, before start of forming, the controller 24 outputs the operational signals 18a and 19a which set the pressure of the full-time play eliminating cylinders 18 and 19 to $P_0$; with play in the vertical and horizontal directions being thus eliminated between the housing 10 and the main bearing axle boxes 11 of the rolls 13, the controller 24 outputs the operational signals 17a which retract the push-up cylinders 17 to make a gap between the rolls 13 greater than a setting value $g_a$, and outputs the operational signals 21a which set the pressure of the non-forming-time play eliminating cylinders 21 to $P_0$ to eliminate play between the rolls 13 and the main bearings 12; in this state, the controller 24 outputs the operational signals 17a which set the extension amount of the push-up cylinders 17 to $S_t$ to set the gap between the rolls 13 to the setting value $g_a$. When the material 1A made of sheet metal to be formed (see FIG. 3) is introduced between the rolls 13 and the forming loads 23a are generated and sensed by the load sensors 23, it is determined as entering into the forming area and the controller 24 outputs the operational signals 21a which change the pressures of the non-forming-time play eliminating cylinders 21 from $P_0$ to 0 to cause the forming of the material 1A. When the forming loads 23a turn to zero, it is determined as entering into the non-forming area and the controller 24 outputs the operational signals 17a which retract the push-up cylinders 17 to change the extension amount from $S_t$ to $S_1$ to increase the gap between the rolls 13 into $g_1$ which is greater than the setting value $g_a$, and outputs the operational signals 21a which set the pressure of the non-forming-time play eliminating cylinders 21 to $P_0$ to eliminate the play between the rolls 13 and the main bearings 12; the controller 24 outputs the operational signals 17a which increase the extension amount of the push-up cylinders 17 from $S_1$ to $S_t$ again to set the gap between the rolls 13 to the setting value $g_a$. When the forming loads 23a are generated, it is determined as entering into the forming area and the controller 24 outputs the operational signals 21a which change the pressure of the non-forming-time play eliminating cylinders 21 from $P_0$ to 0 to cause the forming of the material 1A. Subsequently, the elimination of the play between the rolls 13 and the main bearings 12 in the non-forming area and the forming of the material 1A in the forming area are repeated while the play between the housing 10 and the main bearing axle boxes 11 for the rolls 13 are always eliminated.

An operation of the embodiment will be described.

First, in a preparatory stage before start of the forming, the controller 24 outputs the operational signals 18a and 19a which set the pressure of the full-time play eliminating cylinders 18 and 19 to $P_0$; with the play in the vertical and horizontal directions being thus eliminated between the housing 10 and the main bearing axle boxes 11 for the rolls, the controller 24 outputs the operational signals 17a which retract the push-up cylinders 17 to retain the gap between the rolls 13 greater than the setting value $g_a$, and outputs the operational signals 21a which set the pressure of the non-forming-time play eliminating cylinders 21 to $P_0$ to eliminate the play between the rolls 13 and the main bearings 12; in this state, the controller 24 outputs the operational signals 17a which set the extension amount of the push-up cylinders 17 to $S_t$ to set the gap between the rolls 13 to the setting value $g_a$.

When the material 1A made of sheet metal to be formed (see FIG. 3) is subsequently introduced between the rolls 13 to start the forming, the forming loads 23a sensed by the load sensors 23 jump up; it is determined at this point as entering into the forming area and the controller 24 outputs the operational signals 21a which change the pressures of the non-forming-time play eliminating cylinders 21 from $P_0$ to 0 to cause the forming of the material 1A.

When the forming load 23a subsequently turns to zero, it is determined as entering into the non-forming area and the controller 24 outputs the operational signals 17a which retract the push-up cylinders 17 to change the extension amount from $S_t$ to $S_1$ to expand the gap between the rolls 13 to $g_1$ which is greater than the setting value $g_a$, and outputs the operational signals 21a which set the pressure of the non-forming-time play eliminating cylinders 21 to $P_0$ to eliminate the play between the rolls 13 and the main bearings 12; and the controller 24 outputs the operational signals 17a which increase the extension amount of the push-up cylinders 17 from $S_1$ to $S_t$ again to set the gap between the rolls 13 to the setting value $g_a$.

When the forming load 23a is generated, it is determined as entering into the forming area and the controller 24 outputs the operational signals 21a which change the pressures of the non-forming-time play eliminating cylinders 21 from $P_0$ to 0 to cause the forming of the material 1A. Subsequently, the elimination of the play between the rolls 13 and the main bearings 12 in the non-forming area and the forming of the material 1A in the forming area are repeated while the play between the housing 10 and the main bearing axle boxes 11 for the rolls 13 is always eliminated.

Figure 1:
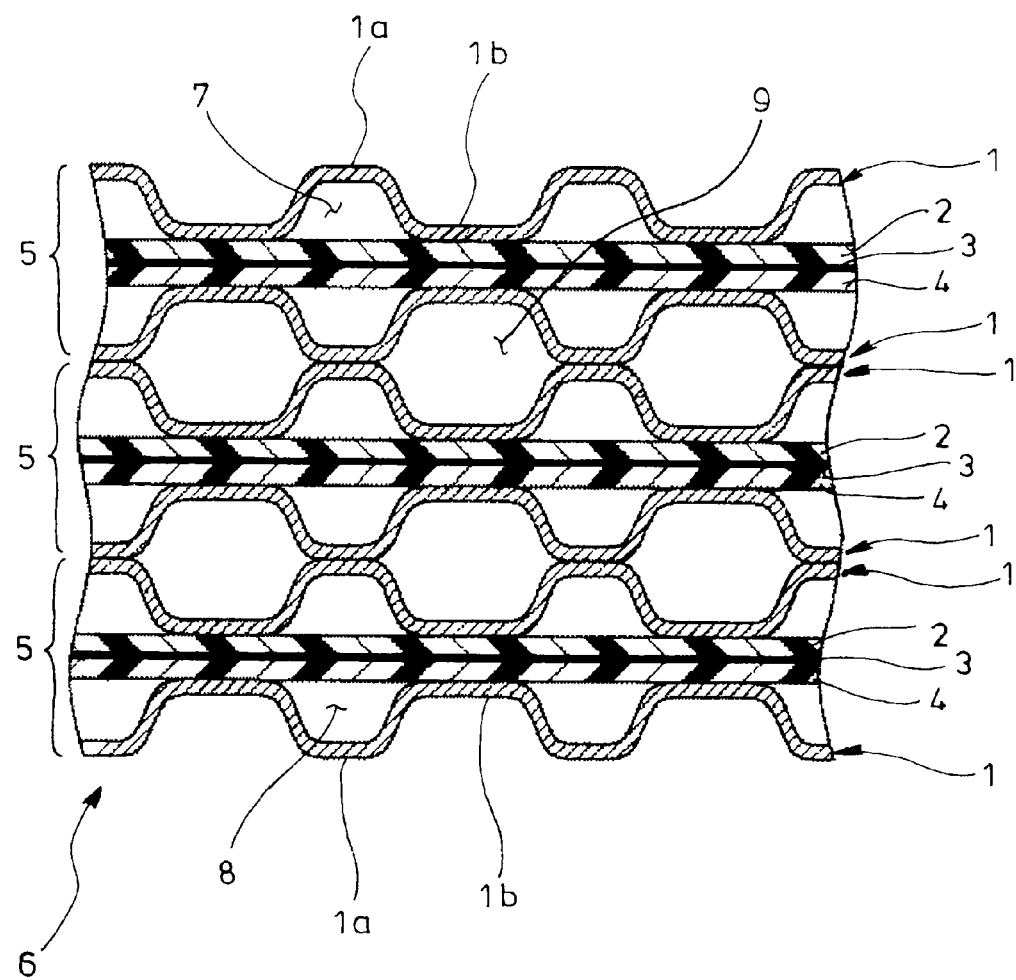
FIG. 1 is an enlarged sectional view of an example of a polymer electrolyte fuel cell.

In this way, the play between the housing 10 and the main bearing axle boxes 11 for the rolls 13 is eliminated by the operation of the full-time play eliminating cylinders 18 and 19; the play between the rolls 13 and the main bearings 12 is eliminated by the operation of the non-forming-time play eliminating cylinders 21; and the gap between the rolls 13 can be retained to the setting value $g_a$ with high accuracy. As a result, even if the material 1A is made of extremely very thin sheet metal, an accuracy required for the forming is acquired to enable the efficient manufacturing of the separators 1 (see FIG. 1) having passages (the hydrogen, air and cooling water passages 7, 8 and 9) created with high accuracy correspondingly to the concaves 14a and the convexes 14b.

Moreover the roll shafts 13c of the rolls 13 are directly coupled to the separate servo motors 26 through the reduction gears 25 including their respective strain wave gearing mechanisms and the reduction gears 25 are directly coupled to the corresponding main bearing axle boxes 11. Thus, when the servo motors 26 are driven, the rotative powers of the servo motors 26 are transmitted through the shafts 26a to the reduction gears 25 including the strain wave gearing mechanisms, decelerated and transmitted to the roll shafts 13c of the rolls 13 and, as a result, the rolls 13 are independently rotated. Since the servo motors 26 have a lower value of speed variance of the order of ±0.01% and therefore have reduced vibrations and since the shafts 26a of the servo motors 26 are directly coupled to the reduction gears 25 including the strain wave gearing mechanisms and no play is generated by, for example, a backlash of a gear or a clearance of a joint, rotative forces with reduced vibration can be transmitted to the reduction gears 25 including the strain wave gearing mechanisms. Since the reduction gear 25 including the strain wave gearing mechanism is a reduction gear having an extremely minimal backlash and therefore the rotative force of the servo motor 26 is transmitted to the roll 13 with vibrations suppressed as much as possible, the roll 13 is stably rotated without vibrations.

Figure 5:
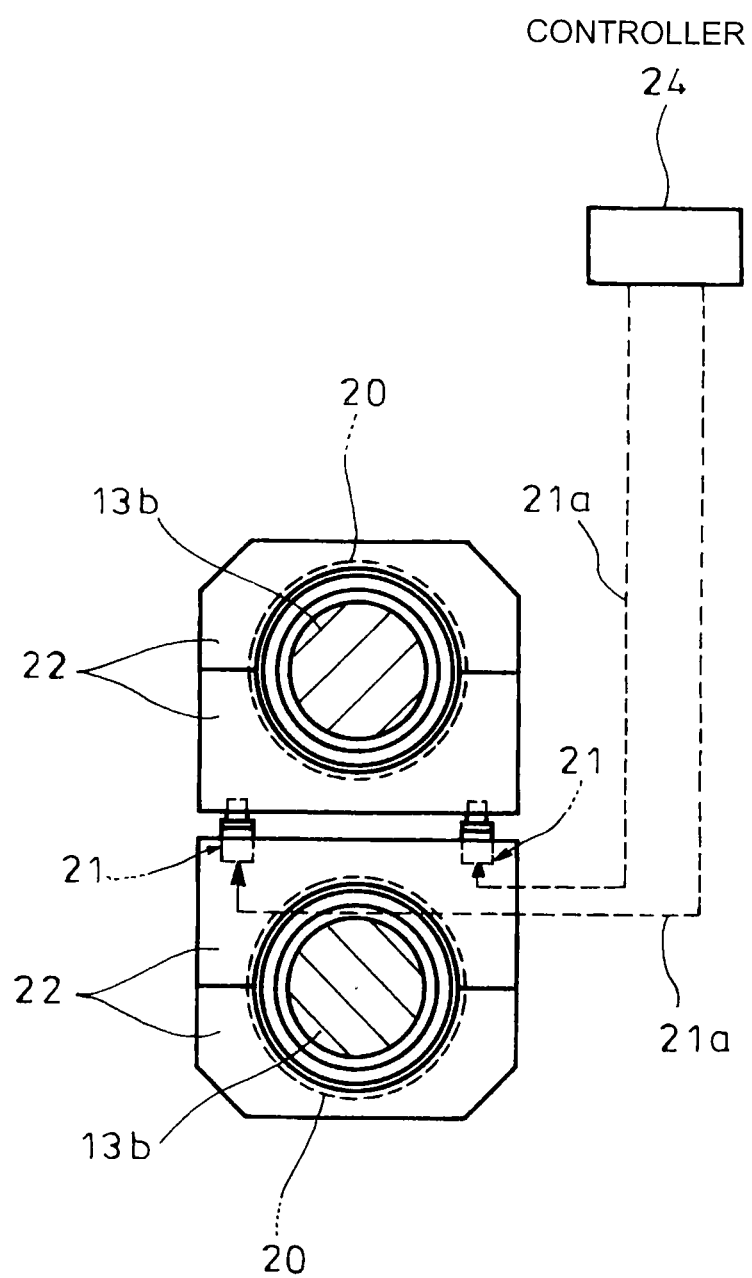
FIG. 5 is a diagram of non-forming-time play eliminating cylinders which eliminate play between the rolls and the main bearings in the embodiment of the invention as well as auxiliary bearings, corresponding to an arrow view taken along V-V in FIG. 2.

Pattern control may be employed such that a longitudinal forming amount of the material 1A becomes constant while any different push-in amount in the forming area is allowed as a function of a different elastic deformation in the forming area due to different fitting of the arc-shaped die 14. For example, in the case of the die 14 fitted tightly to a flattened outer circumferential portion of the roll 13 as shown in FIG. 5 and when the material 1A is formed at a die central portion just below the key 15 causing greater depressing deformation due to lower spring constant of the die portion, the screw-down or depression may be performed in a convenient pushing pattern so as to increase the extension amount of the push-up cylinders 17 beyond $S_t$ and decrease the gap between the rolls 13 below the usual setting value $g_a$.

Thus, the material 1A made of sheet metal to be formed can be formed with high accuracy without deteriorated production efficiency and the separators 1 may be efficiently manufactured with high accuracy.

It is to be understood that a method and a device for manufacturing a separator for a polymer electrolyte fuel cell are not limited to the above embodiment and that various changes and modifications may be made without departing from the scope of the invention.

REFERENCE SIGNS LIST 1 separator
1A material to be formed
1a convex
1b concave
7 hydrogen passage (passage)
8 air passage (passage)
9 cooling water passage (passage)
10 housing
11 main bearing axle box
12 main bearing
13 roll
13a roll body
13b neck
13c roll shaft
14 die
14a concave
14b convex
17 push-up cylinder
17a operational signal
18 full-time play eliminating cylinder
18a operational signal
19 full-time play eliminating cylinder
19a operational signal
20 auxiliary bearing
21 non-forming-time play eliminating cylinder
21a operational signal
22 auxiliary bearing cover
23 load sensor
23a forming load
24 controller
25 reduction gear
26 servo motor
27 wave generator
29 flexspline
30 circular spline

The invention claimed is:

1. A device for producing a separator for a polymer electrolyte fuel cell wherein a material made of sheet metal to be formed is introduced and pressurized between a pair of rolls circumferentially alternately having a forming area with concaves and convexes created on a surface and a non-forming area with no concaves and convexes, thereby continuously manufacturing the separator with passages formed correspondingly to the concaves and convexes of the rolls, said device comprising:

push-up cylinders capable of adjusting a gap between said rolls,
full-time play eliminating cylinders arranged between a housing for said rolls and main bearing axle boxes for eliminating play in vertical and horizontal directions,
auxiliary bearings fitted to necks of said rolls,
non-forming time play eliminating cylinders arranged between said auxiliary bearings for eliminating play between said rolls and the main bearings,
load sensors for sensing forming loads and
a controller for outputting operational signals to said push-up, full-time play eliminating and non-forming-time play eliminating cylinders, respectively, on the basis of the forming loads sensed by said load sensors, whereby elimination of the play between the rolls and the main bearings in the non-forming area and forming of the material in the forming area are repeated while the play between the housing and the main bearing axle boxes is always eliminated.

2. The device for manufacturing a separator for the polymer electrolyte fuel cell as claimed in claim 1, wherein each of the rolls has a roll shaft directly coupled to a servo motor through a reduction gear including a strain wave gearing mechanism, said reduction gear being directly coupled to a corresponding main bearing axle box.

* * * * *